United States Patent [19]
Ritzow et al.

[11] Patent Number: 5,626,747
[45] Date of Patent: May 6, 1997

[54] AQUARIUM OVERFLOW FILTER SYSTEM HAVING A PRE-OVERFLOW WALL

[75] Inventors: Gerald R. Ritzow, Franklin; Denis A. Dann, Milwaukee; Kenneth K. Leis, Waukesha, all of Wis.

[73] Assignee: All-Glass Aquarium Co., Inc., Franklin, Wis.

[21] Appl. No.: 566,138

[22] Filed: Dec. 1, 1995

[51] Int. Cl.⁶ .................................................. A01K 63/04
[52] U.S. Cl. ........................ 210/169; 210/416.2; 119/259
[58] Field of Search ........................ 210/169, 416.2, 210/248, 456; 119/259, 248

[56] References Cited

U.S. PATENT DOCUMENTS

| | | | |
|---|---|---|---|
| 1,442,171 | 1/1923 | Murphy | 210/169 |
| 2,665,250 | 1/1954 | Willinger et al. | 210/16 |
| 3,529,574 | 9/1970 | Kelley et al. | 119/5 |
| 4,267,042 | 5/1981 | Hofmann | 210/169 |
| 4,606,821 | 8/1986 | D'Imperio | 210/169 |
| 4,684,462 | 8/1987 | Augustyniak | 210/97 |
| 5,006,230 | 4/1991 | Votava, III et al. | 210/169 |
| 5,176,824 | 1/1993 | Willinger et al. | 210/169 |
| 5,242,582 | 9/1993 | Marioni | 210/151 |
| 5,306,421 | 4/1994 | Weinstein | 210/151 |
| 5,453,182 | 9/1995 | Kikuta | 210/169 |
| 5,518,611 | 5/1996 | Bresolin | 210/169 |

*Primary Examiner*—Peter A. Hruskoci
*Assistant Examiner*—Betsey J. Morrison
*Attorney, Agent, or Firm*—Andrus, Sceales, Starke & Sawall

[57] ABSTRACT

An aquarium overflow filter system having a pre-overflow wall with openings therein improves circulation of water throughout the aquarium tank. The overflow filter system includes an overflow wall that separates the tank into a main aquarium region and a filter intake region. An intake for a wet/dry filter is located within the filter intake region. A pre-overflow wall located outside of the filter intake region encases at least part of the overflow wall to create a mixing chamber therebetween. Openings in the pre-overflow wall allow water to flow through the pre-overflow wall into the mixing chamber. The openings in the pre-overflow wall can be strategically placed to attain a desired circulation pattern within the aquarium. Water pressure at lower openings in the pre-overflow wall tends to move water upward through the mixing chamber, thus water from all the openings eventually flows over the top of the overflow wall into the filter intake region. The invention can be used to improve filtration circulation and the ability to pick up suspended debris off the bottom of the tank. The invention can also provide more natural flow patterns throughout the aquarium.

14 Claims, 3 Drawing Sheets

5,626,747

AQUARIUM OVERFLOW FILTER SYSTEM HAVING A PRE-OVERFLOW WALL

FIELD OF THE INVENTION

The invention relates to aquarium filter systems, and in particular, to aquarium filter systems using an overflow wall. Such systems usually have a remote filtering system, such as a remote wet/dry filter system with a return pump. The invention improves the circulation of water throughout the aquarium tank.

BACKGROUND OF THE INVENTION

Overflow filter systems are typically used in salt water aquariums, but can also be used in fresh water aquariums. Conventional overflow systems have an overflow wall or barrier that extends continuously upward from the floor of an aquarium tank surrounding a filter intake region. Plumbing for a remote wet/dry filter system and a return pump is usually installed through the floor of the aquarium in the filter intake region. A filter intake and a return line for the wet/dry filter system are typically installed through the floor of the aquarium in the filter intake region. One of the main reasons overflow walls are used is to avoid flooding in the event that the wet/dry filter and/or pump system fails (e.g., because of loss of power to the pump, etc.).

In an overflow filter system, water in the main region of the aquarium tank flows over the top of the overflow wall into the filter intake region. The water in the filter intake region then flows by gravity through a pre-filter at the filter intake and downward out of the aquarium through a drain hole to the remote wet/dry filter. After being filtered in the wet/dry filter, the water is returned to the aquarium by a return pump. Although the return tube is typically installed through the floor of the aquarium in the filter intake region, the outlet spout for the return tube returns the filtered water to the main region of the aquarium tank outside of the filter intake region. Water thus circulates throughout the aquarium system as follows: 1) water from the main region of the aquarium tank flows over the overflow wall into the filter intake region; 2) water in the filter intake region flows through the pre-filter and falls by gravity through the drain hole to the remote wet/dry filter; and 3) filtered water from the wet/dry filter is pumped through a return line to the main region of the aquarium tank outside of the filter intake region.

In conventional overflow filter systems, the pulling action over the overflow wall draws water from the upper layers of the water in the main region of the aquarium tank. However, in most applications, drawing water from the lower layers in the main region of the aquarium tank, or from a combination of upper and lower layers in the main region of the aquarium tank, is desirable.

SUMMARY OF THE INVENTION

The invention is an overflow filter system, preferably for an aquarium having a remote wet/dry filter and a return pump. The system draws water from the lower levels of the main region in the aquarium, or from a combination of upper and lower levels in the main region of the aquarium into a filter intake region. The benefits of drawing water from the lower levels include better filtration circulation, better pick-up of suspended debris off the bottom of the tank, and more natural flow patterns through the tank.

The system includes an overflow wall that separates the tank into the main aquarium region and the filter intake region. A filter intake preferably for a remote wet/dry filter is located within the filter intake region. A pre-overflow wall located outside of the filter intake region encases at least part of the overflow wall to form a mixing chamber between the walls. The pre-overflow wall has one or more openings that allow water from the main region of the aquarium tank to flow through the pre-overflow wall into the mixing chamber. The pre-overflow wall preferably has a lower set of openings to draw water from the lower levels of the tank, and an upper set of openings to draw water from the upper levels of the tank. Water in the mixing chamber between the pre-overflow wall and the overflow wall flows over the overflow wall into the filter intake region where it is drawn through the filter intake to the remote wet/dry filter system.

Testing has shown that the water pressure or head at the lower openings in the mixing chamber tends to move lower water up through the mixing chamber, and eventually over the top of the overflow wall. The amount of water flowing through the lower openings and/or the upper openings can be modified by changing the height of the top of the overflow wall as well as moving the height and number of the lower and upper openings.

The specific dimensions of the overflow wall and the pre-overflow wall as well as the size of the mixing chamber between the walls, and the number, size and location of the openings through the pre-overflow wall can vary depending on the size of the aquarium and the specific circulation pattern that is desired.

The invention provides an aquarium overflow filter system that maintains the advantages of overflow filter systems, while providing a way of improving circulation patterns throughout the aquarium tank.

Other advantages and features of the invention will be apparent upon review the drawings and the following description thereof.

DETAILED DESCRIPTION OF THE DRAWINGS

Figure 1:
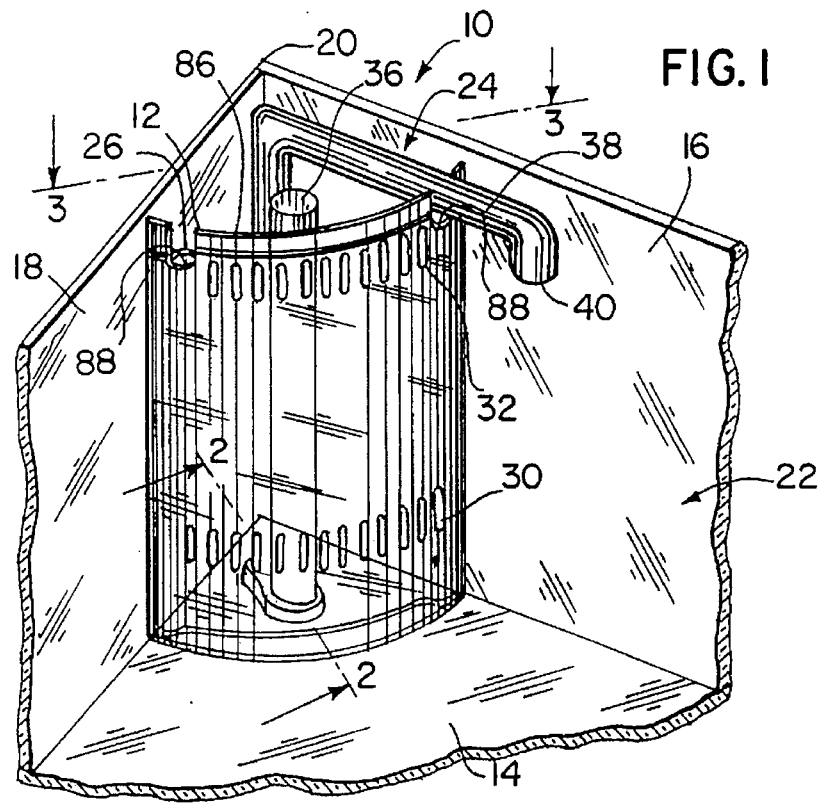
FIG. 1 is a perspective view showing a corner overflow unit having a pre-overflow wall in accordance with the invention.

FIG. 1 shows the portion of an aquarium 10 having a corner overflow unit 12. The term aquarium as used herein should be broadly construed as any kind of holding tank for aquatic animals. The aquarium 10 is a preferably rectangular aquarium, having a bottom 14 and four substantially vertical sidewalls. FIG. 1 shows a first sidewall 16 and a second sidewall 18 intersecting at a corner 20 of the aquarium 10. The corner overflow unit 12 separates the aquarium tank 10 into a main aquarium region 22 and a filter intake region 24.

The corner overflow unit 12 has an overflow wall 26 and, in accordance with the invention, a pre-overflow wall 28. In the preferred embodiment, the pre-overflow wall 28 has a lower set of openings 30 through a lower portion of the pre-overflow wall 28, and an upper set of openings 32 through an upper portion of the pre-overflow wall 28. Both the lower set 30 and the upper set 32 preferably consist of a plurality of elongated vertical slits positioned horizontally along the pre-overflow wall 28. A mixing chamber 34 is formed between the overflow wall 26 and the pre-overflow wall 28.

A filter intake 36 is located within the filter intake region 24 of the tank 10. A filtered water return tube 38 is plumbed through the bottom 14 of the aquarium in the filter intake region 24, but the water return tube 38 has an outlet spout 40 that returns filtered water into the main aquarium region 22 of the tank 10.

Figure 2:
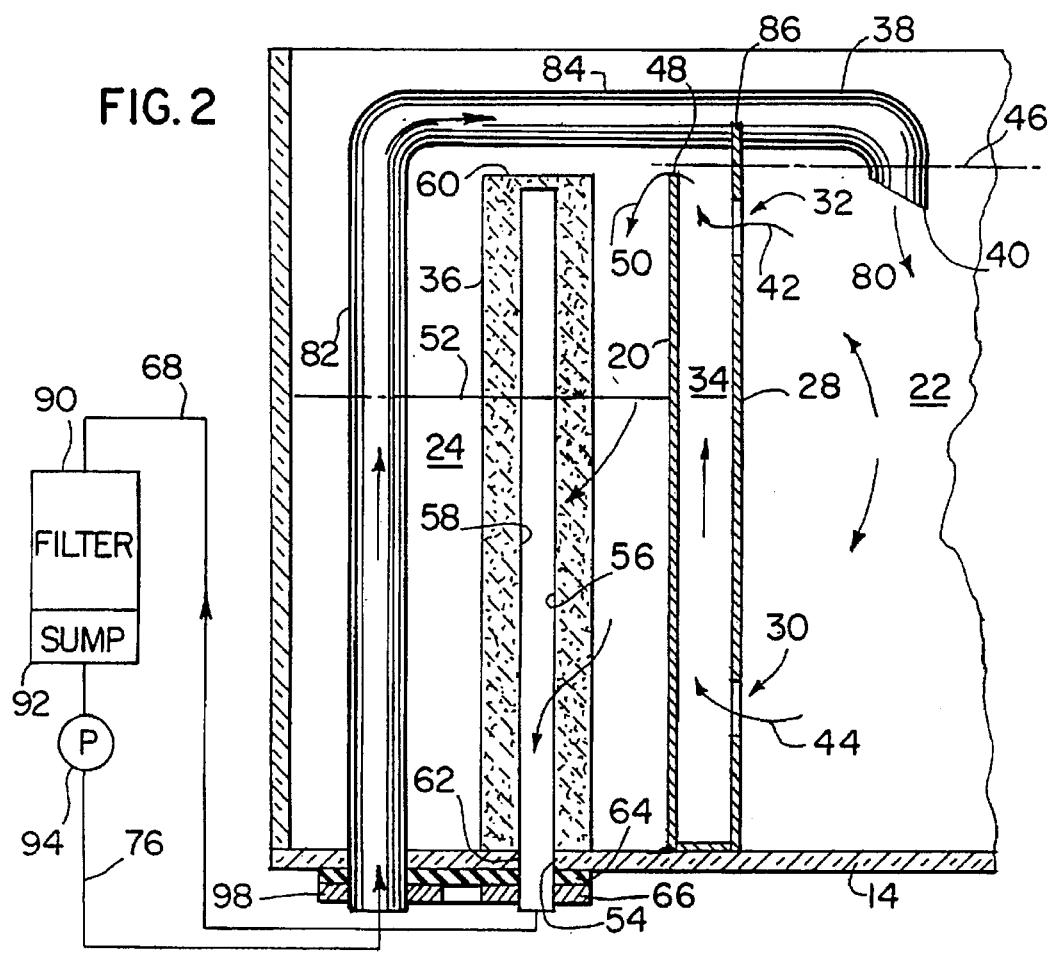
FIG. 2 is a schematic diagram showing the operation of an aquarium overflow filter system taken in part along line 2—2 in FIG. 1.

FIG. 2 schematically shows the operation of the corner overflow unit 12 shown in FIG. 1. In particular, water from the main region 22 of the aquarium tank 10 flows through the upper openings 32 in the pre-overflow wall 28 as depicted by arrow 42, as well as through the lower openings 30 in the pre-overflow wall 28, as depicted by arrow 44. Water flowing through both the lower openings 30 in the pre-overflow wall 28 and the upper openings 32 in the pre-overflow wall 28 combines in the mixing chamber 34 between the overflow wall 26 and the pre-overflow wall 28. The water level in the main region 22 of the aquarium tank 10 and in the mixing chamber 34 is depicted by level line 46. The combined flow through the lower openings 30 and the upper openings 32 is thus sufficiently large so that the water level in the mixing chamber 34 is preferably the same or perhaps slightly less than the water level in the main region 22 of the aquarium tank. The height of the overflow wall 26 determines the water level 46 in the main aquarium region 22 and the mixing chamber 34.

Water in the mixing chamber 34 flows over the top end 48 of the overflow wall 26 into the filter intake region 24, as depicted by arrow 50. The water level in the filter intake region 24 is designated by level line 52. The water level 52 in the filter intake region 24 is substantially lower than the water level 46 in the main aquarium region 22 and mixing chamber 34.

Water in the filter intake region 24 flows by gravity through the filter intake 36, and downward through a drain hole 54 in the bottom 14 of aquarium 10. The filter intake 36 includes a rigid, substantially vertical filter intake tube 56 which is plumbed through the drain hole 54. The upper part of the filter intake tube has perforations therein which allows water in the filter intake region 24 to flow through the walls of the tube 56. A foam robber pre-filter 60 surrounds the upper perforated part 58 of the filter intake tube 56. The foam robber pre-filter 60 both aerates and pre-filters water flowing by gravity through drain hole 54. A typical alternative for the foam robber pre-filter 60 is a biomaterial aeration media.

The lower part 62 of the filter intake tube 56 is plumbed through the bottom 14 of the tank with a seal 64 and threaded fitting 66, to line 68 which leads to a remote wet/dry filter 70. The water is filtered in the wet/dry filter 70, and temporarily held in sump 72. Although FIG. 2 is a schematic depiction, water typically flows from the filter intake downward by the force of gravity through line 68 to the remote wet/dry filter 70 and sump 72. A return pump 74 pumps filtered water in the sump 72 through line 76 back to the return tube 38 in the aquarium 10. The return tube in the aquarium 10 is plumbed through the bottom 14 of the aquarium in the filter intake region 24 using seal 64 and fitting 78. Note that both the filter intake tube 58 and the filter return tube 38 are plumbed through the bottom of the aquarium in the filter intake region 24. This configuration serves to prevent flooding in case the wet/dry filter 70, the sump 72, the return pump 74, or any of the associated plumbing fails.

Although the return tube 38 is plumbed through the aquarium bottom 14 in the filter intake region 24, the filtered water return tube 38 returns the water through spout 40 into the main aquarium region 22 as depicted by arrow 80. The filtered water return tube 38 is defined generally by an upright portion 82 and a transverse portion 84. The top edge 86 of the pre-overflow wall 28 includes one or more downward indentations 88 therein for supporting the transverse portion 84 of the filtered water return tube 38.

Conventional overflow systems currently have only a single wall or barrier such as overflow wall 26 over which water flows into the filter intake region and eventually to the wet/dry filter system. In these conventional systems, the pulling action of the overflow draws water from the main region 22 of the aquarium from only the upper layers in the tank 14. Using the pre-overflow wall 28 with sets of openings 30 and 32 in accordance with the invention as described in FIGS. 1 and 2, the corner overflow unit 12 draws water from both the upper and lower layers in the main aquarium region 22 of the tank. The benefits of drawing water from the lower levels in the main region 22 of the aquarium tank include: 1) better filtration circulation, 2) better pick-up of suspended debris off the bottom of the tank, and 3) a more natural flow pattern across coral reef systems that may be located in the aquarium tank.

The specific dimensions of the overflow wall 26 and the pre-overflow wall 28 as well as the size of the mixing chamber 34 therebetween and the number, size and location of openings 30 and 32 through the pre-overflow wall 28 can vary depending on the size of the aquarium tank 10 and the specific circulation pattern desired. The principal design requirements are that the overflow wall 26 be designed to withstand the tank water pressure, and the pre-overflow wall 28 be designed to regulate the overflow water drawn from the upper and lower water layers within the main region 22 of the aquarium as desired. It is not a requirement that the pre-overflow wall 28 intersect the bottom 14 of the tank, rather the pre-overflow wall 28 can merely encase a portion of the overflow wall 26.

Figure 3:
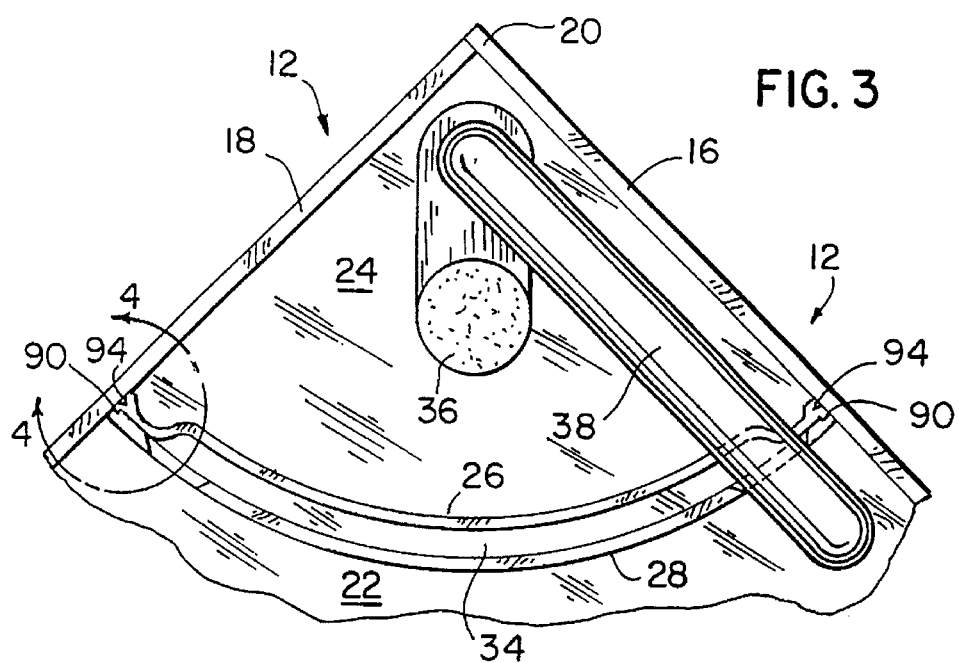
FIG. 3 is a top view of the corner overflow unit shown in FIG. 1 as taken along line 3—3 in FIG. 1.
Figure 4:
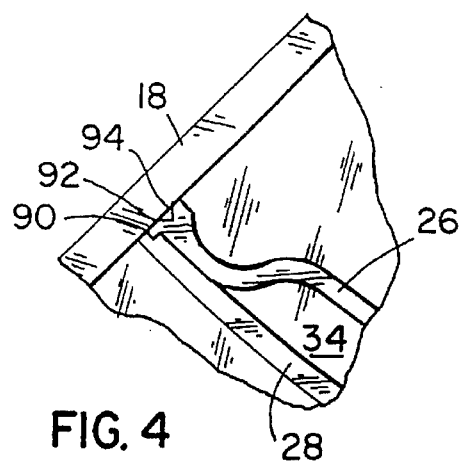
FIG. 4 is a detailed view of the area designated by line 4—4 in FIG. 3.
Figure 5:
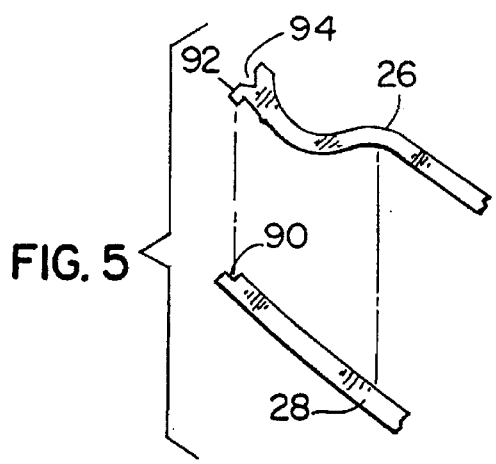
FIG. 5 is an exploded view of the parts shown in FIG. 4.

FIGS. 3 through 10 illustrate the preferred construction of the corner overflow unit 12. The preferred corner overflow unit 12 is made of molded acrylic that is glued to sidewalls 16 and 18 of the tank 10 around the area where the filter intake 36 and the return line 38 are plumbed into the aquarium. Silicone is preferably used to glue the corner overflow unit 12 to the sidewalls 16 and 18 and bottom 14 of the aquarium. Referring in particular to FIGS. 3–5, the overflow wall 26 and the pre-overflow wall 28 are preferably separately manufactured molded acrylic pieces. To ease assembly of the overflow wall 26 and the pre-overflow wall 28, the pre-overflow wall 28 includes a longitudinal notch 90 along its vertical edges. The overflow wall 26 has a longitudinal protrusion 92 extending along the vertical edges of the overflow wall 26 which mates into the longitudinal notch 90 in the pre-overflow wall 28. After the pre-overflow wall 28 and the overflow wall 26 have been mated together along the notch/protrusion edge interface, the overflow wall 26 and the pre-overflow wall 28 can be sonic welded together along the edge interface. The vertical edges of the overflow wall 26 also include a longitudinal V-groove 94. The longitudinal V-groove 94 serves as a locating notch to help align a glue gun thus enabling quicker assembly of the corner unit 12 to the aquarium 10.

Figure 6:
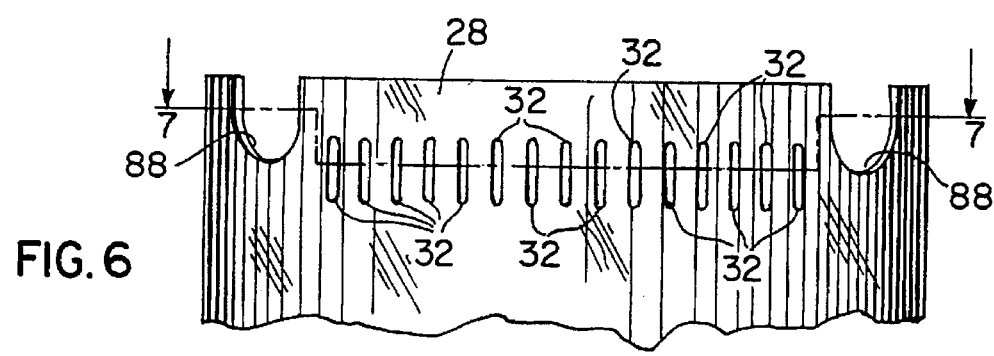
FIG. 6 is a side elevational view of the top part of a pre-overflow wall as used in the preferred embodiment of the invention.

FIGS. 6–10 relate to the preferred configuration for the openings through the pre-overflow wall 28. FIG. 6 illustrates only the upper openings 32 through the pre-overflow wall 28, however, the specific geometry for the lower openings 30 is preferably similar to the upper openings 32. The specific geometry of each opening 30 or 32 is not particularly important in the system because flow through the system is slow. That is, flow through the openings 30 and 32 is generally laminar and the geometry of the openings 30 and 32 will probably not cause the flow through the pre-overflow wall 28 to become turbulent. On the other hand, the relative size of the openings 30 and 32 and the location of the openings 30 and 32 can have a significant effect on the flow patterns in the main portion 22 in the aquarium 10.

Figure 7:
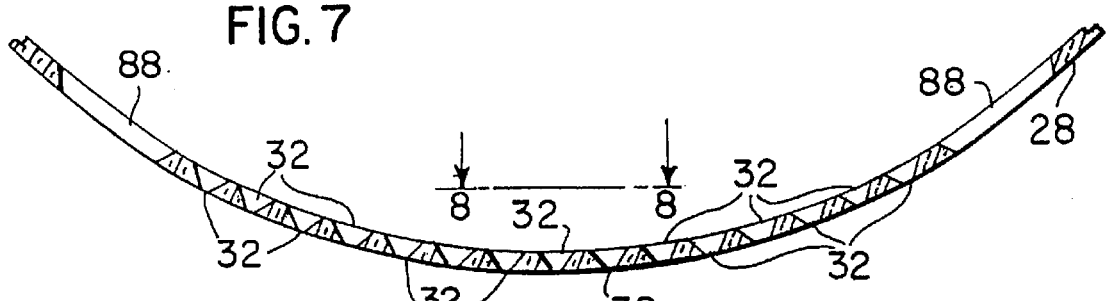
FIG. 7 is a sectional view of the pre-overflow wall taken along lines 7—7 in FIG. 6 in which the pre-overflow wall has a first type of openings.
Figure 8:
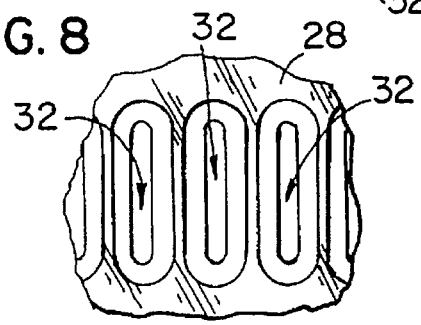
FIG. 8 is a detailed view taken from line 8—8 in FIG. 7 showing a first configuration of openings in the pre-overflow wall.
Figure 10:
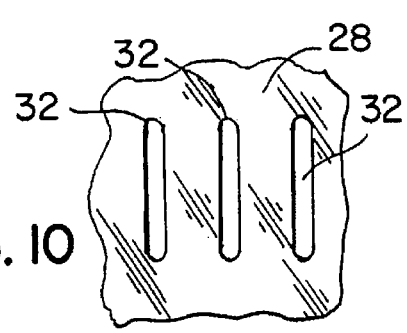
FIG. 10 is an elevational view taken from line 10—10 in FIG. 9 showing openings in the pre-overflow wall having the second configuration.
Figure 9:
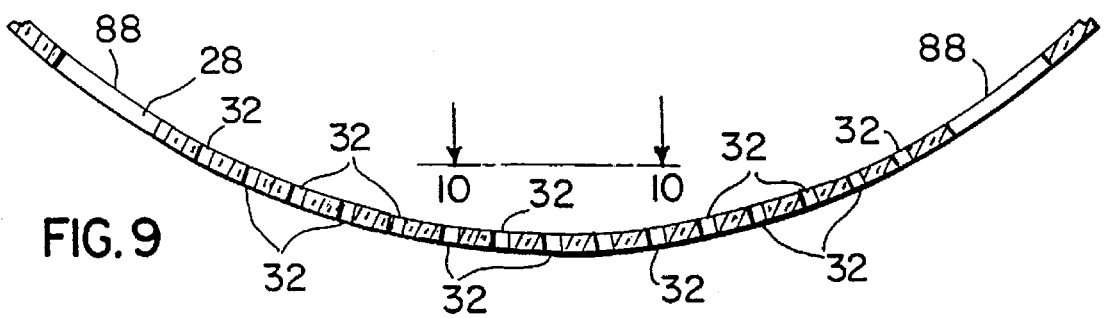
FIG. 9 is a sectional view of the pre-overflow wall taken along lines 7—7 in FIG. 6 in which the pre-overflow wall has a second type of openings.

FIGS. 7 and 8 show a series of longitudinal openings 32 through the pre-overflow wall 28. Each of the openings has a draft angle that enables the molds for the pre-overflow wall 28 to be more easily disengaged. FIGS. 9 and 10 show a series of longitudinal upper openings 32 not having such a draft angle. In practice, the series of openings 32 shown in FIGS. 7 and 8 should operate generally the same as the series of openings 32 shown in FIGS. 9 and 10.

Figure 11:
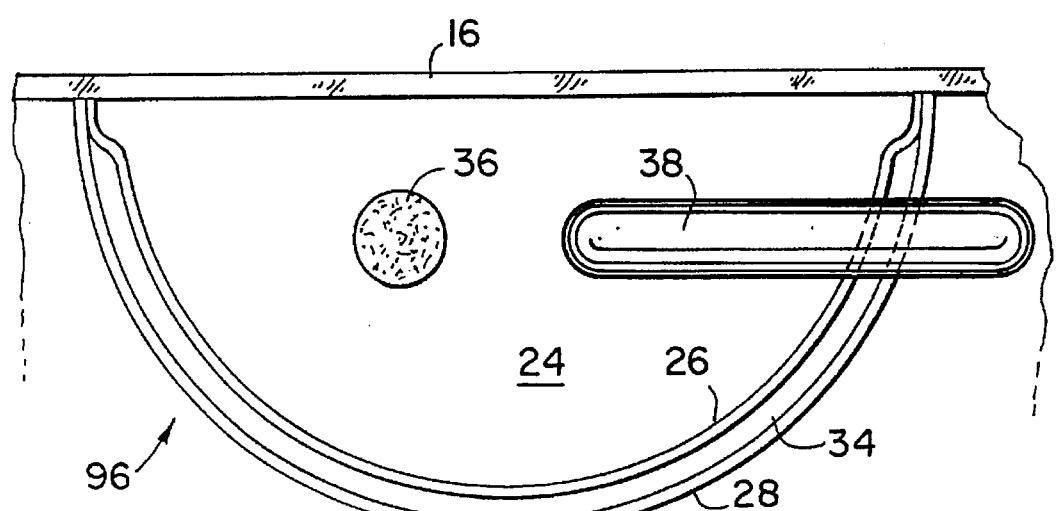
FIG. 11 is a top elevational view of a side overflow unit having a pre-overflow wall in accordance with the invention.

Referring now to FIG. 11, a side overflow unit 96 which is depicted in FIG. 11 operates in substantially the same manner as the corner unit 12 depicted in FIGS. 1–10. The side overflow unit 96 in FIG. 10 is but one example of another way that the invention can be carried out. Other configurations such as a stand-alone overflow unit in the middle of a tank can also be constructed in accordance with the invention.

It is recognized that various equivalents, alternatives and modifications of the invention are possible, and these equivalents, alternatives and modifications should be considered to be within the scope of the following claims.

We claim:

1. An aquarium having an overflow filter system comprising:

a tank having an overflow wall that separates the tank into a main aquarium region and a filter intake region;

a filter intake located within the filter intake region;

a filter that receives water passing through the filter intake from the filter intake region;

a filtered water return tube that returns filtered water to the main aquarium region; and a pre-overflow wall located outside the filter intake region and encasing at least part of the overflow wall to form a mixing chamber therebetween, the pre-overflow wall having one or more openings that allow water from the main region of the aquarium tank to flow through the pre-overflow wall into the mixing chamber;

wherein water flows from the mixing chamber over the overflow wall into the filter intake region.

2. The aquarium as recited in claim 1 wherein the pre-overflow wall has a top edge that is generally higher than a level at which water flows over the overflow wall.

3. The aquarium as recited in claim 2 wherein the top edge of the pre-overflow wall has a downward indentation for holding the filtered water return tube.

4. The aquarium as recited in claim 1 wherein at least one of the openings in the pre-overflow wall is located at a height lower than a height of the top edge of the overflow wall.

5. The aquarium as recited in claim 1 wherein the pre-overflow wall has a lower set of openings through a lower portion of the pre-overflow wall, and an upper set of openings through an upper portion of the pre-overflow wall.

6. The aquarium as recited in claim 5 wherein the lower set of openings through the lower portion of the pre-overflow wall consists of a plurality of elongated vertical slits positioned horizontally along the pre-overflow wall, and the upper set of openings through the upper portion of the pre-overflow wall consists of a plurality of elongated vertical slits located horizontally along the upper portion of the pre-overflow wall.

7. The aquarium as recited in claim 1 wherein the aquarium tank has at least a first and a second vertical wall which intersect to define a corner, and the overflow wall has a first vertical edge sealed to the first vertical wall and a second vertical edge sealed in the second vertical wall.

8. The aquarium as recited in claim 7 wherein the overflow wall is a curved, molded, acrylic piece.

9. The aquarium as recited in claim 1 wherein the aquarium tank is a generally rectangular tank having a horizontal bottom and at least a first and a second vertical wall which intersect to define a corner, and the overflow wall has a first vertical edge sealed to the first vertical wall and a second vertical edge sealed to the second vertical wall.

10. The aquarium as recited in claim 1 wherein the aquarium tank has at least one substantially vertical sidewall, and the overflow wall has a first vertical edge sealed to the sidewall at a first location and a second vertical edge sealed to the sidewall at a second location.

11. The aquarium as recited in claim 1 wherein the aquarium tank has a bottom and the filter intake comprises:

a filter intake tube passing through the bottom of the tank in the filter intake region, the filter intake tube having perforations in the upper part of the tube which is located within the filter intake region of the aquarium tank; and a pre-filter surrounding the upper perforated part of the filter intake tube.

12. The invention as recited in claim 1 wherein the filtered water return tube passes through the tank in the filter intake region of the aquarium.

13. An overflow filter system for an aquarium having a remote wet/dry filter and a return pump, the overflow filter system comprising:

an overflow wall that separates the tank into a main aquarium region and a filter intake region;

a remote wet/dry filter that receives water from the filter intake region;

a filtered water return tube that returns filtered water to the main aquarium region;

a return pump that pumps filtered water through the filtered water return line; and a pre-overflow wall located outside of the filter intake region and encasing at least part of the overflow wall to form a mixing chamber therebetween, the pre-overflow wall having one or more openings that allow water from the main aquarium region to flow through the pre-overflow wall into the mixing chamber;

wherein water flows from the mixing chamber over the overflow wall into the filter intake region.

14. The invention as recited in claim 13 wherein the overflow wall and the pre-overflow wall in the overflow filter system is sealable to one or more walls of the aquarium.

* * * * *